Aug. 16, 1927.
M. W. GATCH
1,639,559
FLY SWATTER
Filed April 8, 1927
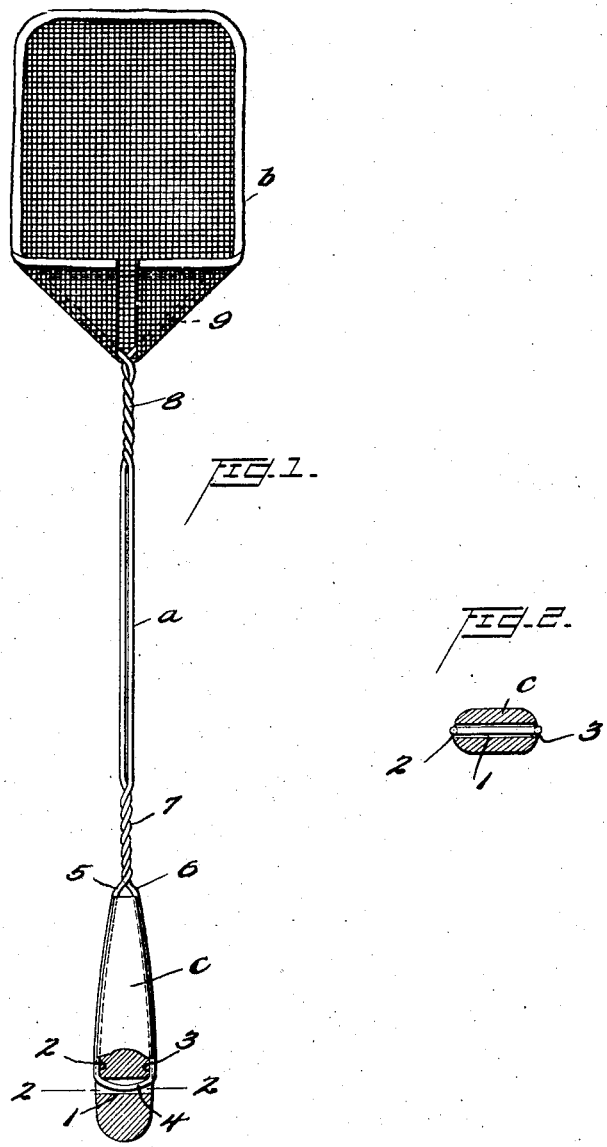

Patented Aug. 16, 1927.

1,639,559

UNITED STATES PATENT OFFICE.

MILTON W. GATCH, OF BALTIMORE, MARYLAND.

FLY SWATTER.

Application filed April 8, 1927. Serial No. 182,101.

This invention relates to improvements in fly swatters, and particularly to the handle portions thereof. In fly swatters having wire shanks, wooden handles have been applied in various ways. In one form of swatter, the handle consists of an oblong piece of wood, tapering toward one end and grooved on its edges, and the wire extends entirely around the handle in the form of a loop. The handle thus forms a filler for the loop in which it is held only by the pressure of the wire fitting within the groove in the handle. In the present invention, in order to make the connection between the handle and the shank more secure, I perforate the handle transversely in its wider portion and provide grooves in the opposite edge of the handle, extending from said perforation to its smaller end, and the wire, instead of extending around the larger end of the handle, extends through said perforation and is doubled upon itself so that its strands lie in the grooves, and these strands are twisted, or otherwise fastened together, close to the handle, thus bringing the wires tightly into the grooves. The handle thus becomes securely fastened to the wire so that it cannot drop out of the loop and, incidentally, less wire is required to form the loop than in devices wherein the loops extend entirely around the handle.

In the accompanying drawing,

Fig. 1 is a plane view of a swatter embodying my invention; and,

Fig. 2 is a transverse section through the handle on the line 2—2 of Fig. 1.

In the drawing, $a$ represents the shank of the swatter, $b$ a flexible sheet secured to one end of the shank, and $c$ represents the handle. The handle is composed of a plate of wood, relatively long in proportion to its width, and tapering from its central portion to the end of the handle which is next to the flexible head or sheet $b$, as shown. A transverse perforation 1 extends through the opposite end portion of the handle, and the handle has grooves 2 and 3 on its opposite edges extending from such perforation to its narrower end. The shank $a$ of the swatter is composed of a wire which, in the manufacture of the swatter, is passed into the perforation 1 until its central portion 4 lies within the perforation, and the wire is then doubled upon itself so that its strands 5 and 6 lie within the grooves 2 and 3, respectively. These strands are then twisted, or otherwise fastened together, as shown at 7, close to the handle, and the wire is thus drawn tightly within the grooves and securely fastened to the wire so that it cannot drop out of the loop, which is formed by the strands, when the swatter is being used. The strands are also twisted together, as shown at 8, and the ends of the strands diverge, as shown at 9, and the flexible head $b$ is suitably attached to these diverging ends.

What I claim is:

A fly swatter comprising an elongated handle, relatively wide at one end and tapering toward the other end, said handle having a perforation extending transversely through its wider portion and having grooves on its opposite edges extending from said perforation to the end of its tapered portion, a shank comprising a wire doubled upon itself, forming two strands, the central portion of said wire extending through said perforation and said strands lying in said grooves, said strands being secured together adjacent the handle to hold the wires in the grooves, and a flexible sheet secured to the ends of said strands.

In testimony whereof I hereunto affix my signature.

MILTON W. GATCH.